US012378808B2

(12) United States Patent
Carl et al.

(10) Patent No.: US 12,378,808 B2
(45) Date of Patent: Aug. 5, 2025

(54) RAIL-SLIDER ASSEMBLY AND WINDOW LIFTER OF A MOTOR VEHICLE HAVING SUCH AN ASSEMBLY

(71) Applicant: Brose Fahrzeugteile SE & Co. Kommanditgesellschaft, Bamberg, Bamberg (DE)

(72) Inventors: Andre Carl, Ebersdorf (DE); Carsten Häring, Ahorn (DE)

(73) Assignee: Brose Fahrzeugteile SE & Co. Kommanditgesellschaft, Bamberg, Bamberg (DE)

(*) Notice: Subject to any disclaimer, the term of this patent is extended or adjusted under 35 U.S.C. 154(b) by 0 days.

(21) Appl. No.: 18/157,928

(22) Filed: Jan. 23, 2023

(65) Prior Publication Data

US 2023/0151670 A1 May 18, 2023

Related U.S. Application Data

(63) Continuation of application No. PCT/EP2021/070286, filed on Jul. 20, 2021.

(30) Foreign Application Priority Data

Jul. 22, 2020 (DE) ..................... 10 2020 209 250.8
May 5, 2021 (DE) ..................... 10 2021 204 546.4

(51) Int. Cl.
*E05F 11/38* (2006.01)
*E05F 15/689* (2015.01)

(52) U.S. Cl.
CPC .......... *E05F 11/382* (2013.01); *E05F 15/689* (2015.01); *E05Y 2201/64* (2013.01); *E05Y 2400/654* (2013.01)

(58) Field of Classification Search
CPC ............... E05F 15/689; E05Y 2201/64; E05Y 2400/654; E05Y 2600/53; E05Y 2900/55; E05Y 11/382
(Continued)

(56) References Cited

U.S. PATENT DOCUMENTS 4,815,984 A * 3/1989 Sugiyama ........... B60R 16/0239 296/146.7
4,942,499 A * 7/1990 Shibata ............... B60R 16/0239 361/825
(Continued)

FOREIGN PATENT DOCUMENTS

CN 106068194 A 11/2016
DE 102009036267 A1 2/2011
(Continued)

*Primary Examiner* — Justin B Rephann
(74) *Attorney, Agent, or Firm* — Laurence A. Greenberg; Werner H. Stemer; Ralph E. Locher

(57) ABSTRACT

A rail-slider assembly for a window lifter of a motor vehicle. The rail-slider assembly has a rail slider with a slider interface in relation to a guide rail and a driver-device interface for an in particular functionalized and/or electrically switchable or controllable window panel and also with at least one mechanical fastening interface. The rail-slider assembly further has an interface adapter, which is or can be mounted on the mechanical fastening interface of the rail slider, or on a window-panel adapter, and has retaining elements for the in particular form-fitting fastening of a cable guide or of an electric cable and/or of an electric power connector.

15 Claims, 15 Drawing Sheets

(58) Field of Classification Search
USPC .............................................................. 49/352
See application file for complete search history.

(56) References Cited

U.S. PATENT DOCUMENTS

| | | | | |
|---|---|---|---|---|
| 5,907,213 | A | 5/1999 | Oshima et al. | |
| 6,315,590 | B1 * | 11/2001 | Grois | G02B 6/3897 439/353 |
| 6,406,192 | B1 * | 6/2002 | Chen | H01R 13/6315 439/248 |
| 7,086,687 | B2 * | 8/2006 | Aoki | H02G 11/006 191/23 R |
| 7,213,370 | B2 * | 5/2007 | Dedrich | E05F 11/382 49/358 |
| 7,500,331 | B2 * | 3/2009 | Hiramatsu | E05F 15/689 49/358 |
| 10,427,504 | B2 * | 10/2019 | Mueller | B60J 1/1846 |
| 10,439,321 | B2 * | 10/2019 | Klein | H01R 13/6275 |
| 11,008,796 | B2 | 5/2021 | Heppner et al. | |
| 11,318,818 | B2 * | 5/2022 | Arimoto | E05F 15/689 |
| 11,530,567 | B2 * | 12/2022 | Nam | B60J 1/17 |
| 11,745,566 | B2 * | 9/2023 | Nam | B60R 16/03 359/265 |
| 2001/0052203 | A1 * | 12/2001 | Doshita | B60R 16/0215 49/502 |
| 2006/0042167 | A1 * | 3/2006 | Dedrich | E05F 15/689 49/358 |
| 2006/0059782 | A1 * | 3/2006 | Garcia | B60R 16/0215 49/358 |
| 2008/0005971 | A1 * | 1/2008 | Dickie | E05F 15/689 49/349 |
| 2010/0147586 | A1 | 6/2010 | Pieh et al. | |
| 2014/0247473 | A1 * | 9/2014 | Kuhnen | B60J 3/04 359/238 |
| 2018/0090876 | A1 * | 3/2018 | Klein | H01R 43/26 |
| 2023/0151670 | A1 * | 5/2023 | Carl | E05F 11/382 49/348 |

FOREIGN PATENT DOCUMENTS

| | | | |
|---|---|---|---|
| DE | 102009037674 | A1 | 2/2011 |
| DE | 102011056227 | A1 | 6/2013 |
| DE | 102012202510 | A1 | 8/2013 |
| DE | 102013104602 | A1 | 11/2014 |
| DE | 202015102718 | U1 | 8/2016 |
| DE | 102015207315 | A1 | 10/2016 |
| DE | 102015214377 | A1 | 2/2017 |
| EP | 2801689 | A1 | 11/2014 |
| EP | 3122583 | B1 | 10/2018 |
| FR | 3063468 | A1 | 9/2018 |
| WO | 2014122146 | A1 | 8/2014 |

* cited by examiner

RAIL-SLIDER ASSEMBLY AND WINDOW LIFTER OF A MOTOR VEHICLE HAVING SUCH AN ASSEMBLY

CROSS-REFERENCE TO RELATED APPLICATION

This application is a continuation, under 35 U.S.C. § 120, of copending International Patent Application PCT/EP2021/070286, filed Jul. 20, 2021, which designated the United States; this application also claims the priority, under 35 U.S.C. § 119, of German Patent Applications DE 10 2020 209 250.8, filed Jul. 22, 2020, and DE 10 2021 204 546.4, filed May 5, 2021; the prior applications are herewith incorporated by reference in their entirety.

FIELD AND BACKGROUND OF THE INVENTION

The invention relates to a rail slider assembly of or for a window lifter of a motor vehicle. Furthermore, it relates to a window lifter, in particular with or for a functionalized window pane of a motor vehicle, with a rail slider assembly of this type.

Components or parts of an (in particular, electric motor) window lifter, preferably a cable window lifter, are frequently arranged or mounted or can be mounted on a carrier plate. The components or parts of the window lifter and the carrier plate form an assembly or door module, for example also for a functionalized window pane of a motor vehicle.

A functionalized window pane is understood to mean, in particular, an electrically switchable or controllable (motor vehicle) glazing part, that is to say a window pane with an electrically switchable or actuable/controllable functional layer, in particular an electro-transparent layer, a layer which has the function of an antenna, a heatable layer, or an illuminable layer. In other words, a functional layer, which is, in particular, optical and/or thermal, of the window pane is provided, the functions of which can be influenced, varied, switched or controlled by means of electric control signals. A functionalized window pane is also understood to mean a dimmable glazing part in the manner of an electro-active or electrochromic glass ("smart glass").

In order to actuate functionalized window panes of this type, they have to be coupled for the transmission of the control signals to an energy source and/or a control device ("controller") as electronics. In the case of movable or adjustable window panes of a motor vehicle, for example a side window pane or a sunroof, in particular, the signal-transmitting connection between the window pane and the electronics is realized by way of correspondingly routed lines or by means of a cable with lines of this type for the supply of current and/or signals.

In accordance with published, non-prosecuted German patent application DE 10 2009 036 267 A1, the cable or line routing can take place by means of a winding reel for partially receiving the cable. The guidance of lines or an (electrical) cable for the supply of current and/or signals to a movable component can also take place via an aid in the form, for example, of a lever arrangement, to which the electrical cable is fastened and on which it is guided. Thus, for example, published, non-prosecuted German patent application DE 10 2012 202 510 A1 has disclosed an apparatus for operating an electric load which is arranged in or on a movable transparent flat element by means of a supply and/or signal line which is arranged on a lever arrangement.

Published, non-prosecuted German patent application DE 10 2012 202 510 A1 has disclosed, in the case of a height-adjustable window pane, the degree of transmission of which can be varied by means of an applied electric voltage, using a lever arrangement with two levers which are connected in an articulated manner to one another, and fastening a supply and/or signal line to an electric load arranged on the window pane, by means of clamps or clips in a positionally fixed manner to levers which are configured as a rotary joint.

SUMMARY OF THE INVENTION

The invention is based on the object of specifying a rail conductor assembly with a rail slider which can be used in a particularly flexible manner and can be used with simple means for attaching a window pane both with and without an electrically switchable or actuable/controllable functional layer.

The rail slider assembly, in particular for a window lifter of a motor vehicle, has a rail slider with a slider interface to a guide rail, and with a driver interface for an (in particular, functionalized and/or electrically switchable or controllable) window pane, and with at least one mechanical fastening interface. Furthermore, the rail slider assembly has an interface adapter which is mounted or can be mounted on the mechanical fastening interface of the rail slider, with holding elements or holding structures or holding contours for fastening a cable guide or an electrical cable and/or an electric connector plug, in particular in a positively locking manner. The interface adapter can also be provided and configured for securing on a pane adapter. The pane adapter is possibly preferably arranged between the window pane and the rail slider. A positive or form-locking connection is one that connects two elements together due to the shape of the elements themselves, as opposed to a force-locking connection, which locks the elements together by force external to the elements (e.g. ball and socket).

A rail slider is understood to mean, in particular, a rail slider with a driver function for the window pane. The rail slider can therefore also be called a driver with a rail slider function. An interface adapter is understood to mean a joining component which is, in particular, mechanical and is held on or fastened to the rail slider (or to the pane adapter) on one side and, on the other side, has holding or joining elements for the cable guide, for the electrical cable and/or for the connector plug. The interface adapter can also be called a cable or guide adapter or generally an adapter.

A cable guide is understood to mean, in particular, a flexible tube or else a drag chain-like guide element for guiding the cable. An electrical cable is understood to mean, in particular, a number of electrical lines with or without an additional cable sheath which encloses a line bundle as an additional (electric) insulation. A connector plug is understood to mean, in particular, a contact element which makes contact with the cable or with the lines, for example a plug or socket part, which is provided and configured to make contact with or to be connected electrically (and possibly mechanically) to a corresponding mating contact part on the window pane or on the rail adapter.

The window pane is fastened to the rail slider which is guided such that it can be moved slidingly along a guide rail of the window lifter. To this end, the rail slider has the slider interface to the guide rail and the driver interface to the (in particular, also functionalized and/or electrically switchable or actuable) window pane, or to the rail adapter, and the at least one mechanical fastening interface for the cable guide, the (electrical) cable and/or for the connector plug as a plug or contact element.

The slider interface is preferably an (in particular, approximately L-shaped) wraparound means of the rail slider on a profile portion or a guide contour of the guide rail. The driver interface is preferably a snap fastener (snap-in fastening) which is in one piece with the rail slider, or a screw and/or clamping fastener, held on the rail slider, for the window pane.

The mechanical fastening interface serves to secure (in particular, releasably) the interface adapter (cable or guide adapter) as holding or fastening element for the cable or for the lines, for a cable guide element and/or for a connector plug which is linked to the cable or lines. To this end, the rail slider is configured as a carrier for the adapter, in order, in the case of a functionalized, energizable window pane, for the same rail slider (as it were, as an identical part for a window pane with or without an electrically switchable or actuable functional layer) to be provided merely with the adapter. The adapter serves to secure or to fasten the (electrical) cable, which is also always to be understood to mean corresponding electric lines in the following text. The adapter is in turn configured as a carrier for the cable guide, for example a flexible guide tube for receiving the cable, and/or for the connector plug for electronics or for an electric element on or for the window pane.

The rail slider preferably has both a fastening interface for an (interface) adapter which holds the cable, preferably at the plug-side cable end, and also for an adapter, on which the guide tube is held. To this end, the rail slider expediently has a first mechanical fastening interface on the flat side which faces away from the slider interface, and a second fastening interface on a narrow side, in particular on a narrow side which faces the slider interface. The rail slider can therefore be used for different variants of adapters which can in turn have different joining elements firstly for fastening to the rail slider and secondly for securing the cable or the guide tube or the connector plug. In addition, or as an alternative, the (interface) adapter can be used for different variants of rail sliders.

In other words, the rail slider assembly has a rail slider with a first holding structure for fastening a cable holder or a component which guides the cable, and a second holding structure for fastening a plug holder for the connector plug or for a cable portion which leads to this connector plug. Contours or structures of the rail slider which are already present are suitably used or applied for this purpose. Corresponding joining contours of the respective (interface) adapter are adapted to these rail slider-side joining contours or structures. The adapter can therefore be joined to the rail slider in a simple way, in particular can be latched to it, preferably releasably, or can be clipped onto it. The (interface) adapters which are provided and configured as cable holders and/or as plug holders are expediently provided as separate components.

In one advantageous refinement, the rail slider has a grid-like, strut-like or web-like joining contour as fastening interface for the interface adapter. The joining contour is arranged on that (flat) side which faces away from the slider interface or, in the mounted state, of the guide rail. The interface adapter suitably has a number of joining elements, which number corresponds to the slider-side joining contour in order to produce a latching or clip connection.

In one expedient development, in the mounted state on the rail slider, the interface adapter spans the rail slider, preferably completely, transversely with respect to the slider and/or rail longitudinal direction.

In accordance with one suitable embodiment, the rail slider has a tubular or flute-like holding structure as fastening interface for the interface adapter. This holding structure which is provided, in particular, on a narrow side which faces the slider interface and/or the guide rail is preferably formed from two sleeve-like receiving chambers, spaced apart from one another, for cable end bottoms which are arranged on the end side of a cable pull. The adapter can then be clamped between them. This rail slider-side holding structure therefore assumes a corresponding double function. To this end, the interface adapter expediently has joining contours which correspond to the slider-side holding structure in the form, in particular, of corresponding joining grooves or joining channels for producing a latching or clamping connection to the rail slider.

For secure and, in particular, releasable securing of the cable, the connector plug and/or the cable guide, the interface adapter preferably has a number of latching elements. The latter are suitably configured as hose clip-like or cable tie-like holding brackets.

A particularly suitable window lifter of a motor vehicle has at least one guide rail and a rail slider assembly of this type with a rail slider of this type and with at least one provided (interface) adapter which, in particular in the case of the use of a functionalized window pane, is joined to the rail slider, and to which the cable or a guide tube which is provided for this purpose is fastened.

Other features which are considered as characteristic for the invention are set forth in the appended claims.

Although the invention is illustrated and described herein as embodied in a rail-slider assembly and a window lifter of a motor vehicle having such an assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Parts and sizes which correspond to one another are always provided with the same designations in all the figures.

Figure 1:
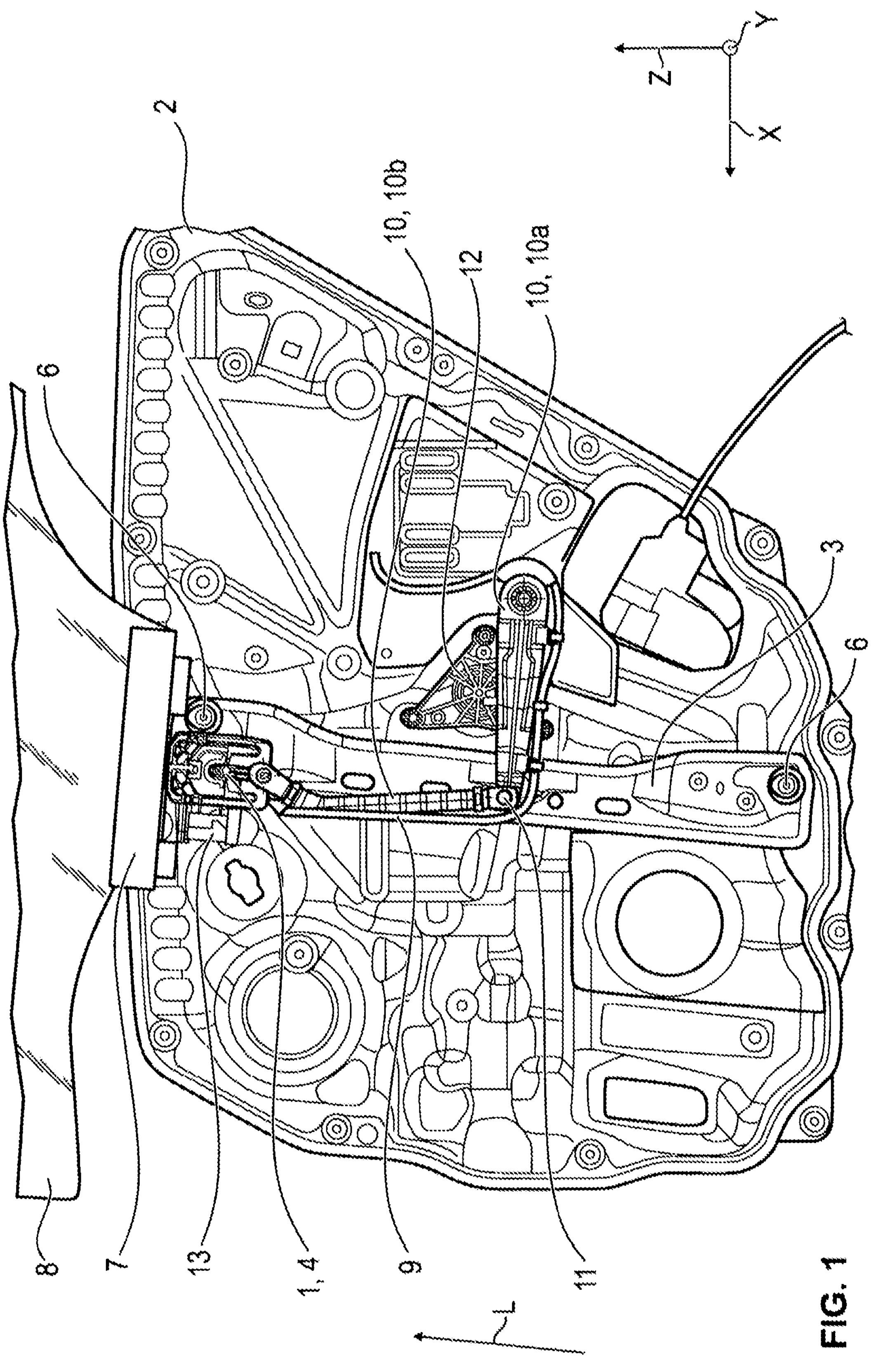
FIG. 1 is a perspective view of an assembly of a (cable) window lifter with a guide rail which is fixed to the carrier with a rail slider (driver), guided displaceably thereon, of a rail slider assembly, and with a lever arrangement with an electrical cable guided therein for energizing and/or controlling a functionalized window pane which is coupled to the rail slider, and with an (interface) adapter of the rail slider assembly for securing the electrical cable in the region of a connector plug on the rail slider.

Referring now to the figures of the drawings in detail and first, particularly to FIG. 1 thereof, there is shown a window lifter as adjusting device of a motor vehicle, with a rail slider assembly 1 and with a carrier plate (carrier) 2, for example of a door module, on which a guide rail 3 is mounted, on which the rail slider assembly 1 is guided.

In the following text, specifications with regard to the spatial directions are also indicated, in particular, in a coordinate system of the motor vehicle (vehicle coordinate system) with regard to an exemplary installed position of a window lifter in a side door of the motor vehicle. Here, the abscissa axis (X-axis, X-direction) is oriented along the vehicle longitudinal direction (driving direction), and the ordinate axis (Y-axis, Y-direction) is oriented along the vehicle transverse direction, and the applicate axis (Z-axis, Z-direction) is oriented along the vehicle height.

The rail slider assembly 1 has a rail slider 4 which is guided such that it can be moved slidingly on the guide rail 3 in the rail longitudinal direction L, or a driver with a rail slider function, or a rail slider with a driver function as a movable component, and an interface adapter 5. The (mounted) guide rail 3 which is arranged on the carrier plate 2 is oriented in the Z-direction. The carrier plate 2 lies or extends in the XZ-plane.

An electric motor drive (cable drive) 12 is coupled in a way which is not shown in greater detail to a cable drum, on which a pull cable 25 (FIG. 3) which is connected to the rail slider 4 as movable component and is guided over rail-side or carrier-side deflection elements 6 is wound as a loop, with the result that, during operation of the window lifter, one cable end is wound onto the cable drum and the other cable end is unwound from the latter. As a result, an adjustment of a window pane 8 which is connected to the rail slider 4 via a pane adapter 7 takes place, in order to move the window pane 8 in the mounted state along the adjustment path between a closed position (first end position) which is shown in FIG. 1 and an open position (second end position).

Here, the window pane 8 is a functionalized, in particular electrically switchable or controllable, window pane. This or the pane adapter 7 expediently has an electric contact point for an electrical cable 9 for energizing or controlling the window pane 8 or its actuable layer or coating.

A lever arrangement 10 with a first lever 10*a* and with a second lever 10*b* is held rotatably on the carrier plate 2. To this end, the first lever 10*a* is fastened to the carrier plate 2 as a stationary component such that it can be moved rotationally. The second lever 10*b* is held by a second rotary joint (joint pin 31, FIG. 6) on the rail slider 4 as a movable component such that it can be moved rotationally. The opposite or free lever ends of the two levers 10*a*, 10*b* are coupled in a rotary connection (rotary joint) 11 and are held such that they can be rotated or moved pivotably therein with respect to one another about a rotational axis which is oriented in the Y-direction.

The window lifter, in particular its lever arrangement 10 and the electrical cable 9 held on it or guided with it, and the guide rail 3, the rail slider assembly 1, 4, 5 which is guided thereon, the window pane 8 which is coupled to the rail slider 4, and possibly components or parts of the electric motor drive 12 are arranged in what is known as the wet space of the vehicle door. The carrier plate 2 as door module or module carrier separates the wet space from the dry space, facing the vehicle interior compartment, within the vehicle door.

The interface adapter 5 which is called adapter for short in the following text is held, preferably releasably, on the rail slider 4. A portion 29 (FIG. 6) of the electrical cable 9 with a connector plug 13 mounted thereon for plug-in contacting with the pane-side or pane adapter-side electric contact point, for example with a mating plug or a plug socket, is held in turn on this interface adapter 5.

Figure 2:
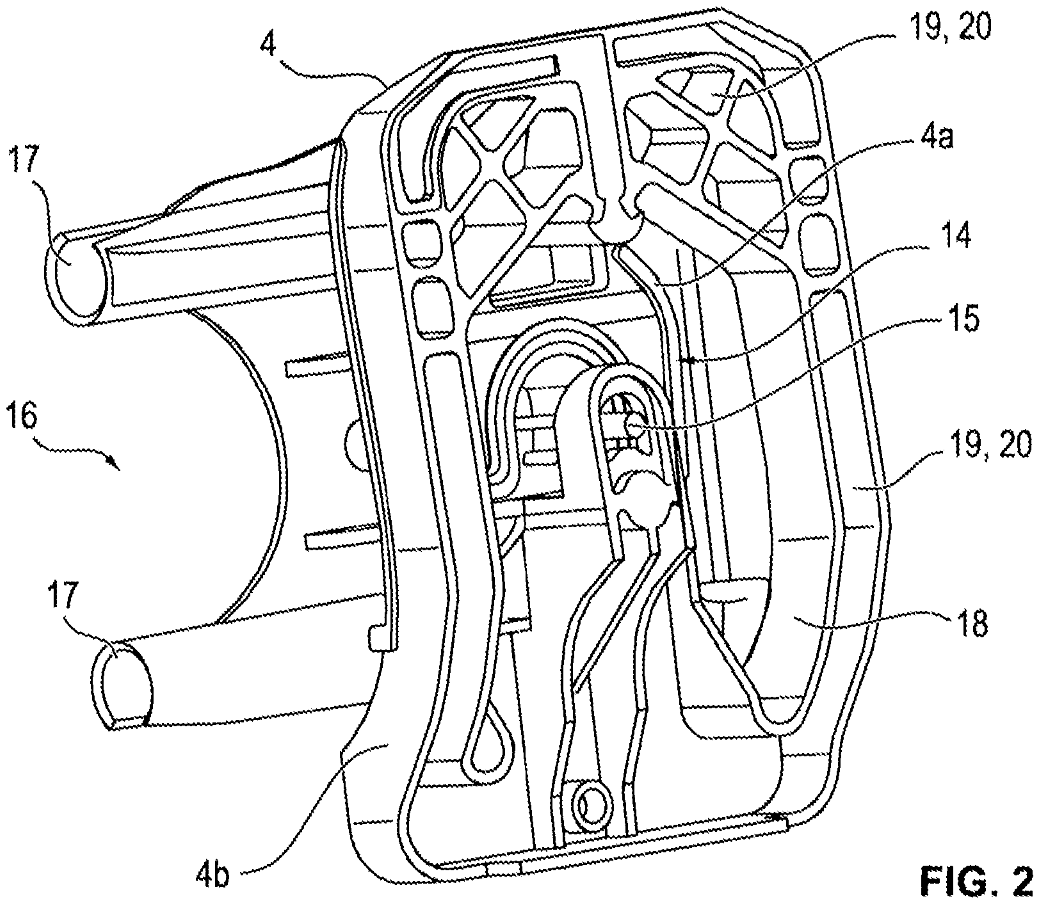
FIG. 2 is a perspective view of the rail slider with a driver function or interface and a joining contour as fastening interface for the interface adapter.

FIG. 2 shows the rail slider 4 with a guide or sliding limb 4*a* which faces the guide rail 3 or is guided on the latter, and with a clamping limb 4*b*. In the mounted state, the window pane 8 or the pane adapter 7 is received by way of a corresponding portion between these two limbs 4*a*, 4*b* which form a driver interface 14 for the window pane 8. Here, one of the limbs 4*a*, 4*b* can have a latching lug which, during mounting, latches into a corresponding pane or adapter opening of the pane adapter 7. A screw connection can also be provided via a corresponding fixing structure 15 in the form of a screw hole, a threaded hole or the like for a clamping screw.

The rail slider 4 has (here, on the guide or sliding limb 4*a*) a holding structure with the formation of a fastening interface 16 in the form of two tubular, cylindrical or sleeve-shaped receiving chambers 17 which are spaced apart from one another. In addition, the rail slider 4 has (here, on the clamping limb 4*b*) a grid-like, strut-like or web-like joining contour 19 as further fastening interface 20 on the flat side 18 which faces away from the guide rail 3. The fastening interfaces 16, 20 serve for (mechanical) fastening of the interface adapter 5. This suitably has a number of joining elements which correspond with the slider-side holding structure 17 or with the joining contour 19 in order to produce a latching, plug or clip connection.

Figure 3:
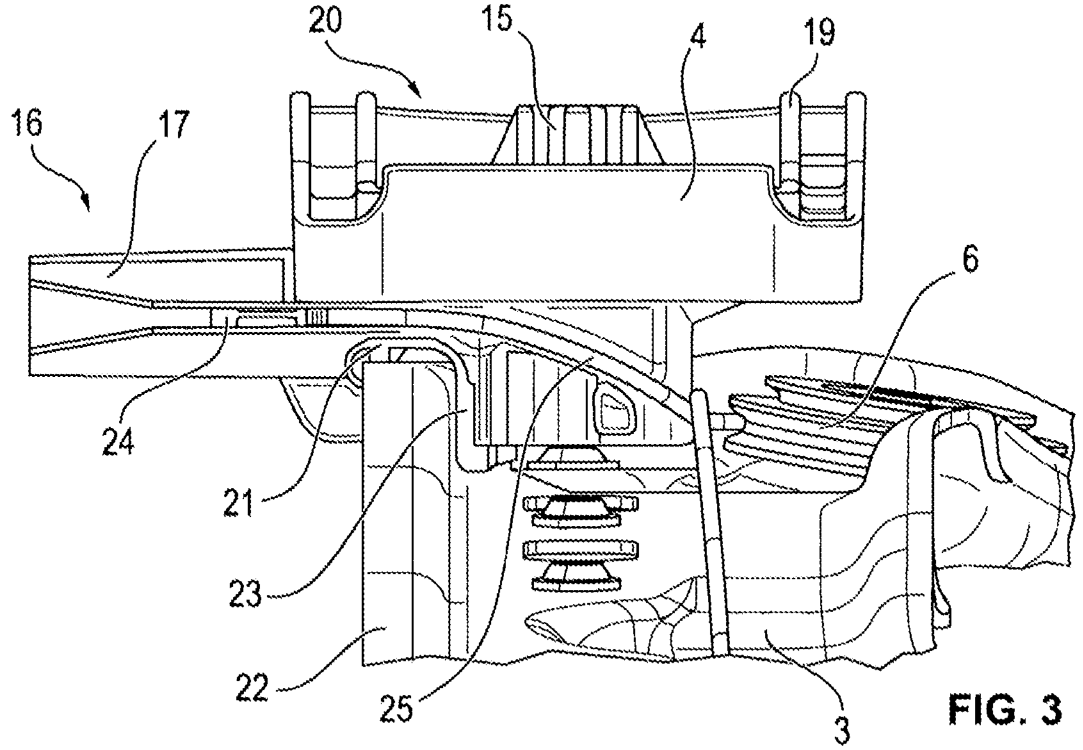
FIG. 3 is a side view of the rail slider with an L-shaped rail wraparound means as slider interface on a guide contour (a profile portion) of the guide rail.

FIG. 3 shows a side view of the rail slider 4 with an L-shaped rail wraparound means as slider interface 21 on a profile portion or an erected guide contour 22 of the guide rail 3, of which details are shown. A low-friction sliding insert 23, in particular made from thermoplastic, preferably from POM (polyoxymethylene), is arranged in the rail wraparound means of the slider interface 21. Cable end bottoms 24, fixed on the cable end side, of corresponding pull cables 25 of the window lever cable pull are seated, in particular in a positively locking manner, in the sleeve-shaped receiving chambers 17 which serve as a holding structure with formation of the fastening interface 16.

Figure 4:
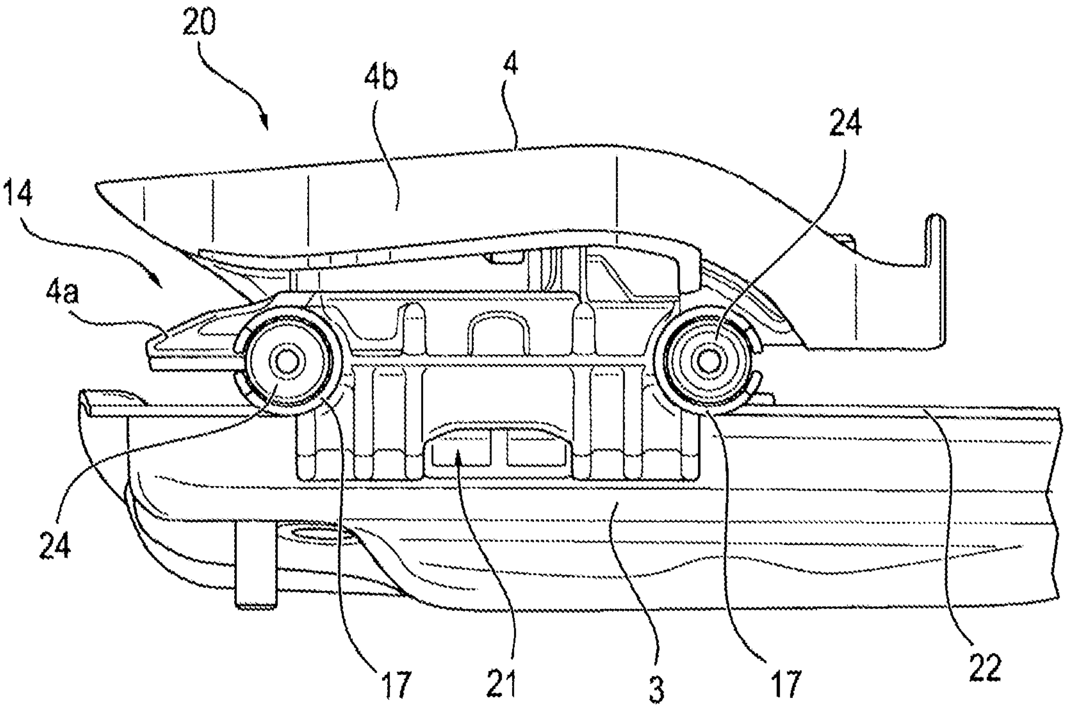
FIG. 4 is a side view (turned in comparison with FIG. 3) of the rail slider with a view onto or into the driver interface.

FIG. 4 shows a side view, turned by 90° in comparison with FIG. 3, of the rail slider 4 with the rail wraparound means as slider interface 21 to the guide rail 3, and with the driver interface 14 in the form of the sliding and clamping limb 4*a*, 4*b*.

Figure 5:
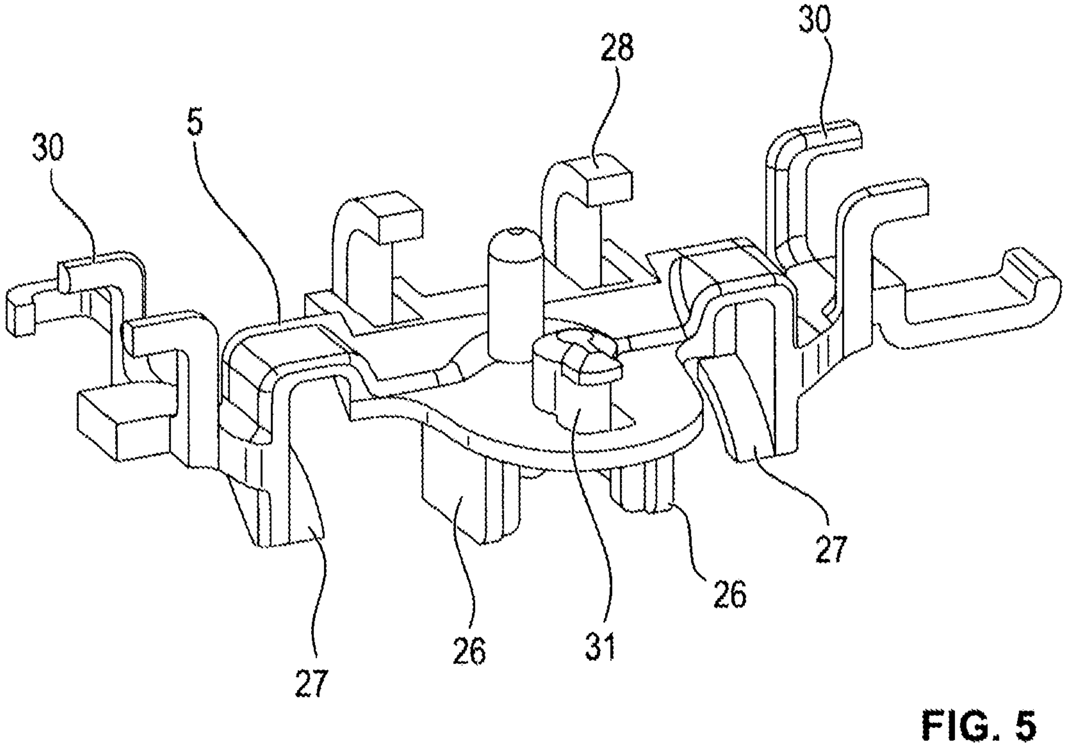
FIG. 5 is a perspective view of a first variant of an interface adapter for use as a plug holder for a connector plug or for a cable or line portion, leading to this connector plug, on the rail slider.

FIG. 5 shows one variant of the interface adapter 5 as a (plug) holder for the connector plug 13. The interface adapter 5 has joining elements 26, 27 which are adapted to the preferably already existing joining contour 19 of the rail slider 4 in the region of its fastening interface 20, and correspond with it in order to produce or with production of a latching or clip connection as a preferred positively locking connection.

Figure 6:
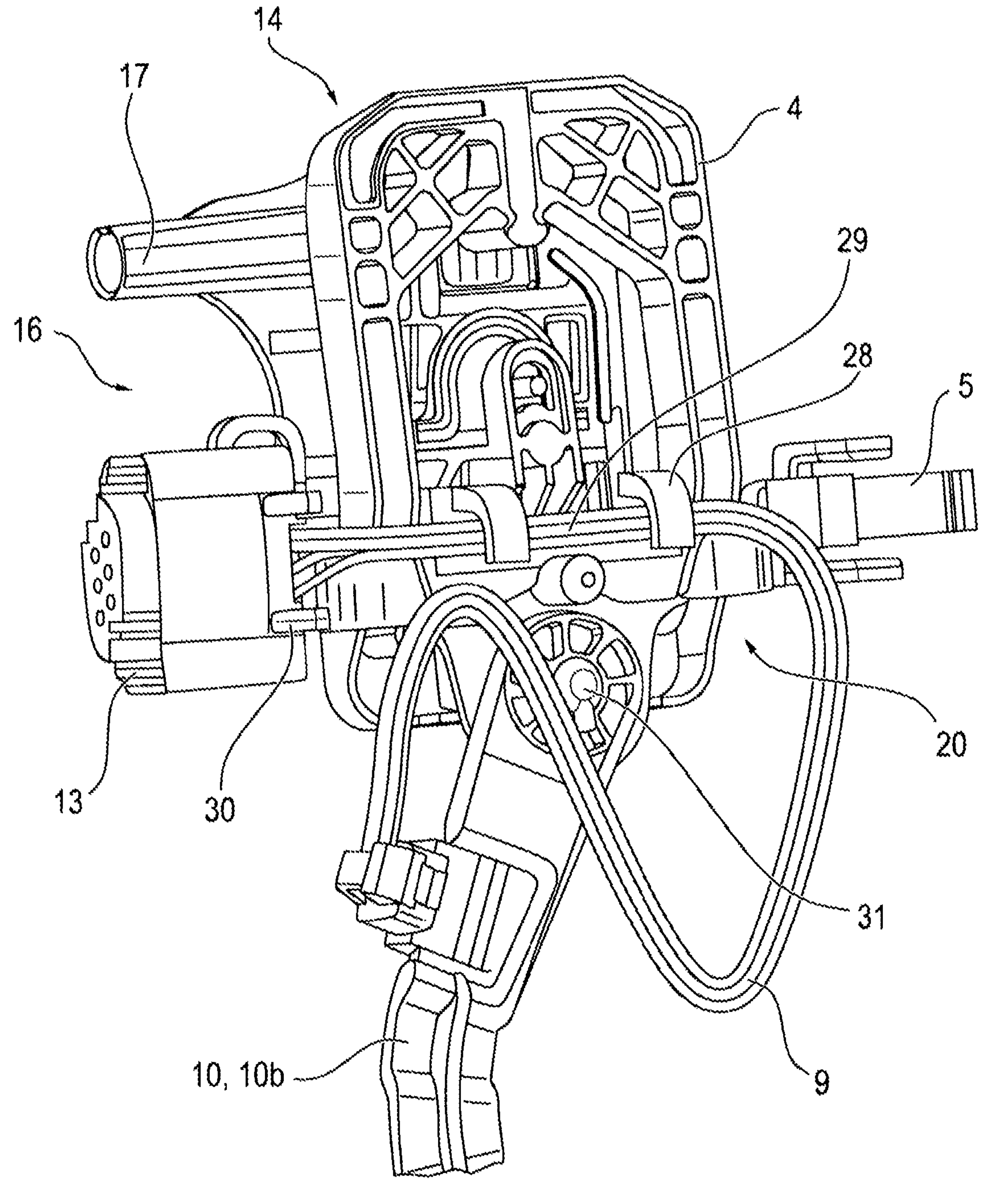
FIG. 6 is a perspective view of the rail slider with a mechanical fastening interface and an interface adapter according to FIG. 5 attached thereto.

As can be seen from FIG. 6, the adapter-side joining elements 27 engage over or behind the joining contours 19 of the rail slider 4 at its fastening interface 20. Here, the interface adapter 5 spans the rail slider 4 completely transversely with respect to the rail longitudinal direction L. In the exemplary embodiment, the interface adapter 5 has two hook-like holding elements 28 for a line or cable portion 29 (FIG. 6) which leads to the connector plug 13, and likewise has hook-like clamping or holding elements 30 for the connector plug 13. A joint pin 31 which is molded onto the interface adapter 26 serves for rotationally movable securing of the second lever 10*b* of the lever arrangement 10, on which the electrical cable 9 is held and guided.

Figure 7:
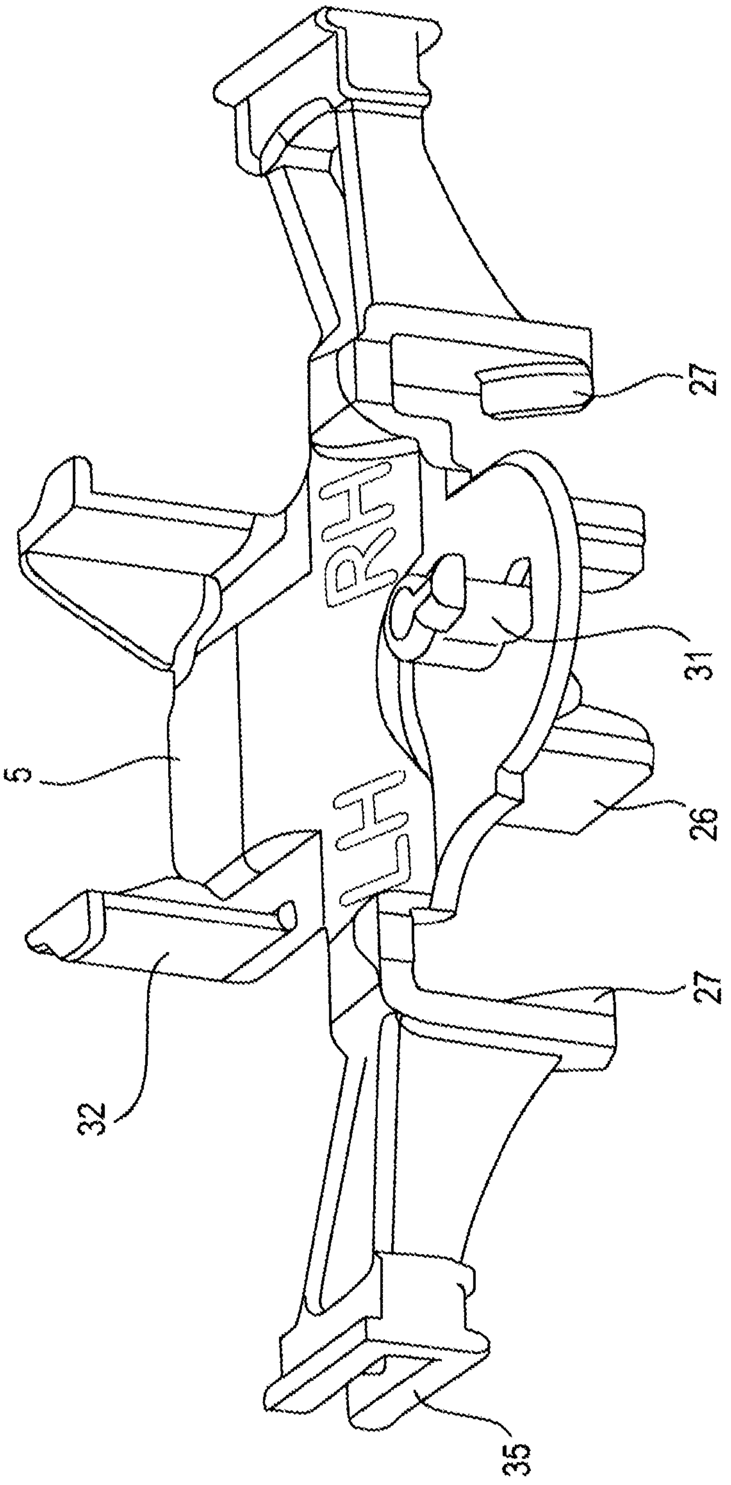
FIG. 7 is a perspective view of a second variant of the interface adapter for use as a cable guide for the electrical cable.
Figure 8:
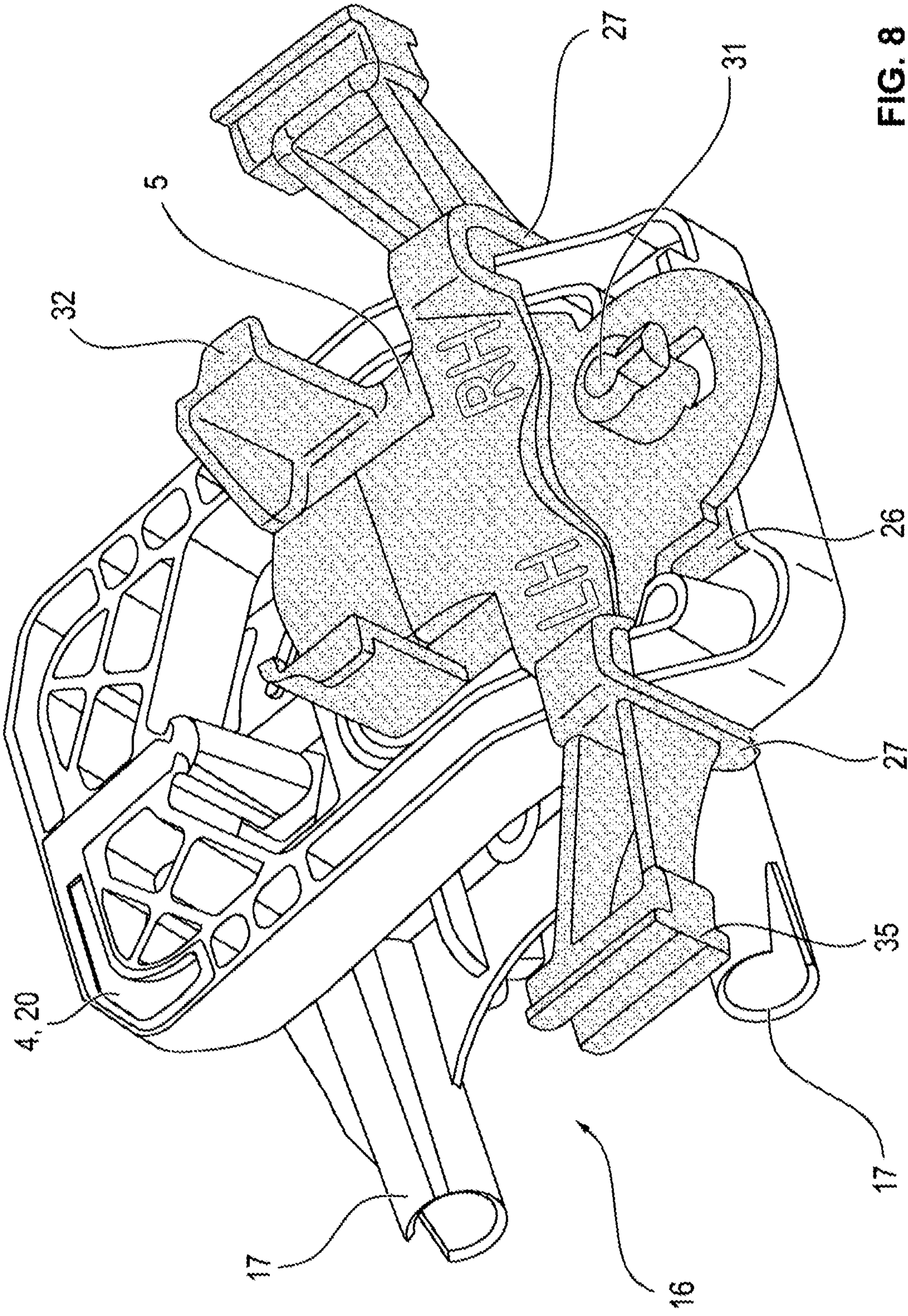
FIG. 8 is a perspective illustration of the interface adapter according to FIG. 7 which is joined to the rail slider.
Figure 9:
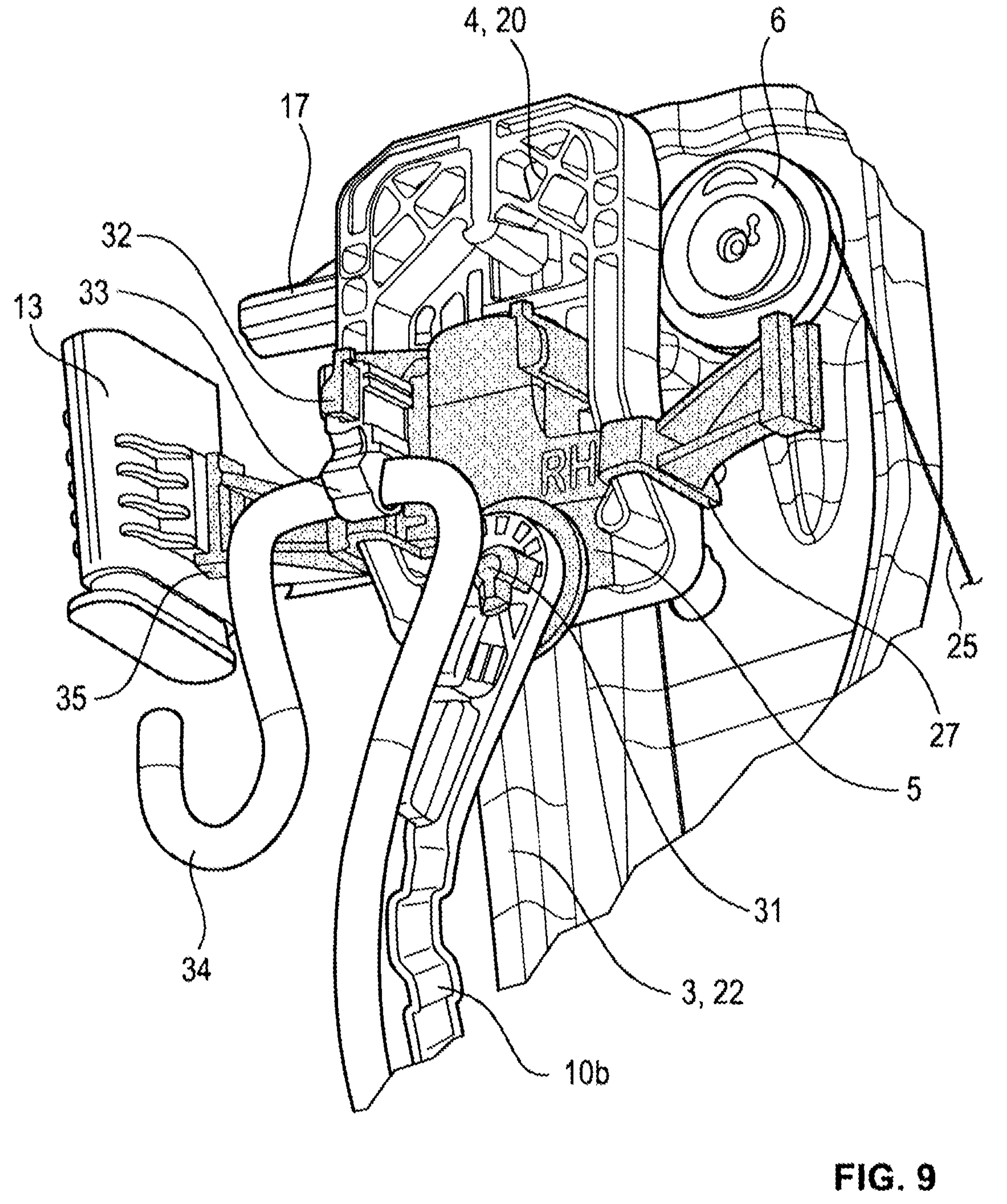
FIG. 9 is a perspective illustration of the rail slider with a mechanical fastening interface and an interface adapter according to FIGS. 7 and 8 attached thereto.

FIGS. 7 to 9 show a second variant of an interface adapter 5 for use as a cable guide for the electrical cable 9. The interface adapter 5 of this variant once again has joining elements 26, 27 which are adapted to the joining contour 19 of the rail slider 4 in the region of its fastening interface 20, and engage over or behind (FIG. 8) this joining contour 19, preferably with the production of a latching or clip connection as a preferred positively locking connection.

The interface adapter 5 of this variant has a holding structure 32 which extends in the Y-direction. As can be seen in FIG. 9, this holding structure 32 serves to secure a clamp element 33 for a guide tube 34 as cable guide. In addition, the interface adapter 5 of this variant has a holding contour 35, extending in the X-direction, for the connector plug 13.

Figure 10:
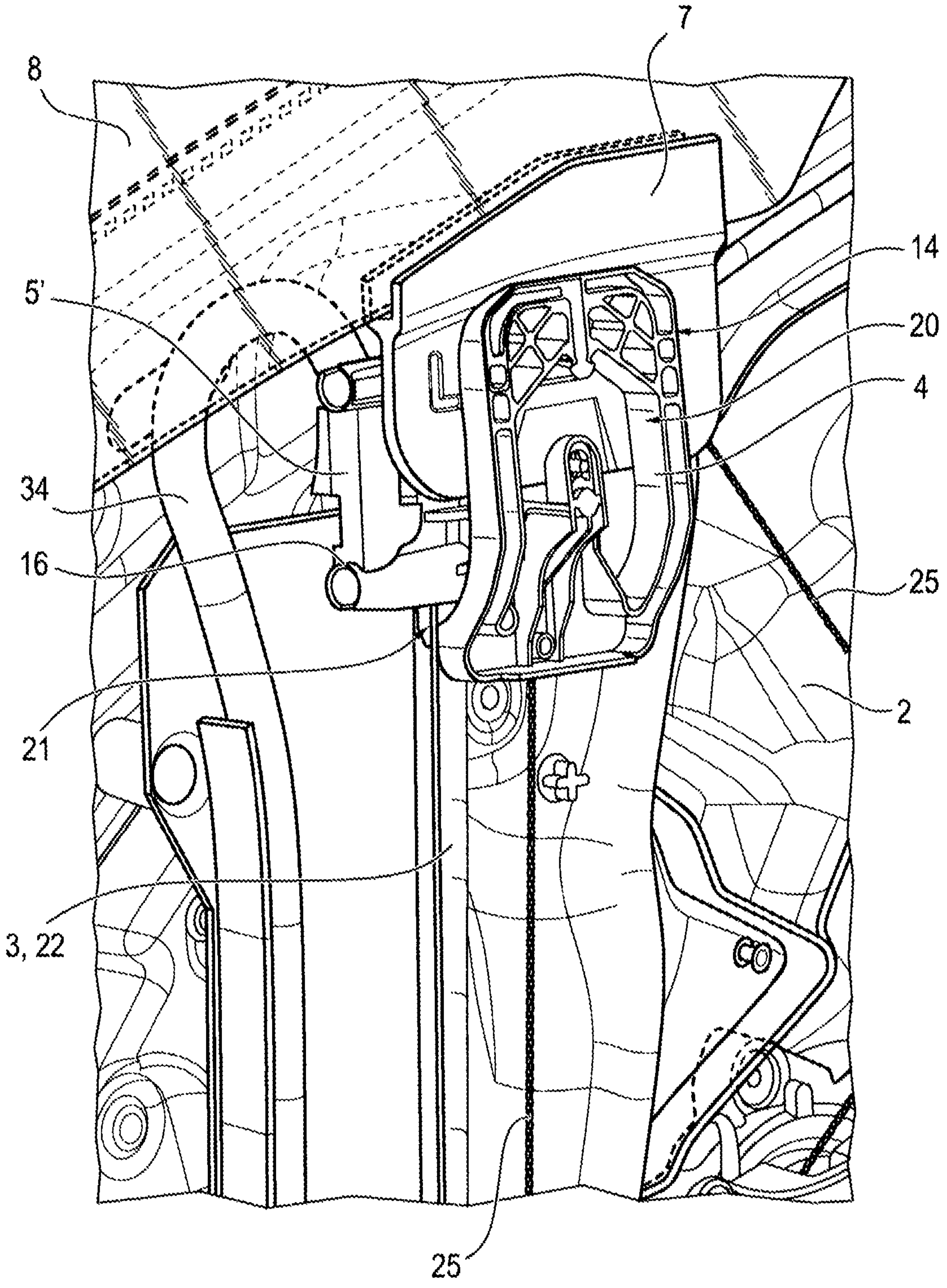
FIG. 10 is a perspective illustration showing details of the window lifter with a rail slider assembly which is guided movably on the guide rail and is attached to the window pane, with the rail slider and an interface adapter of a third variant fastened thereto for use as a cable guide for the electrical cable.

FIG. 10 shows details of the window lifter with the rail slider assembly 1 with a further variant of an interface adapter 5'. Identical parts are also provided here with the same designations. The carrier plate (module carrier) 2 with a guide rail 3 arranged thereon is once again shown, on which guide rail 3 the rail slider assembly 1 with the rail slider 4 (with driver function) and with the interface adapter 5' is guided such that it can be moved slidingly in the rail longitudinal direction L. The elastic, in particular resiliently flexible, guide tube 34 is guided as cable guide on the interface adapter 5', in which guide tube 34 the electrical cable 9 which is connected or can be connected to the functionalized window pane 8 is received.

Figure 11:
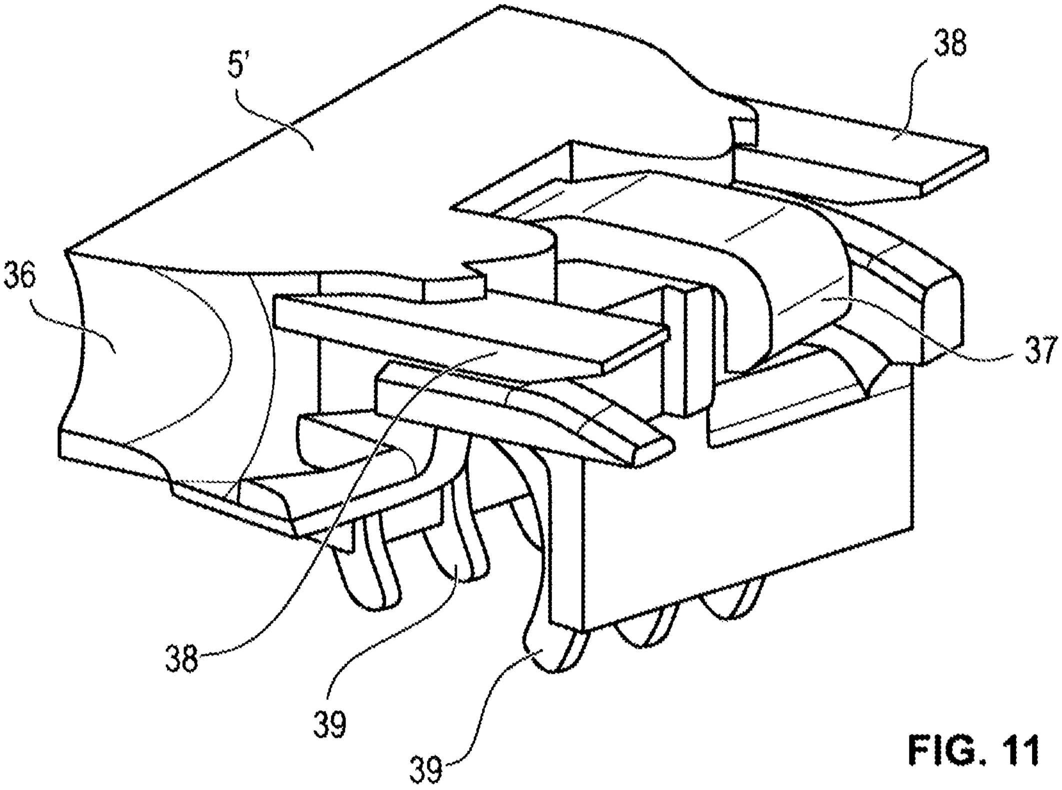
FIG. 11 is a perspective illustration of the interface adapter according to FIG. 10.

FIG. 11 shows the interface adapter 5' which, in an analogous manner with respect to the other variants, is provided as a separate component for cable guidance or securing. The interface adapter 5' has joining contours 36 which are adapted to the joining or holding structure 17 of the fastening interface 16 of the rail slider 4 and correspond with them. A latching element or a clamp 37 of the adapter 5' engages over a corresponding contour of the rail slider 4 at its fastening interface 16. Clamp-like or fork-like joining elements 38 of the adapter 5' engage over and under the corresponding contour of the rail slider 4 at its fastening interface 16, with the result that the adapter 5' is joined or can be joined securely to the rail slider 4. Gripper-like holding structures 39 of the adapter 5' serve to secure the cable guide 34 which is engaged around by the holding structures 39.

Figure 12:
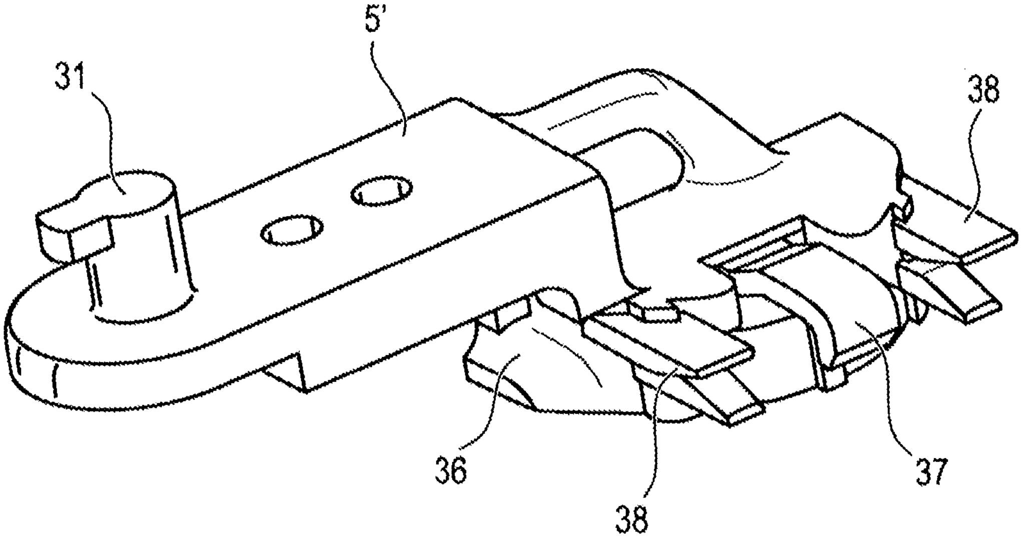
FIG. 12 is a perspective illustration of a fourth variant of the interface adapter.

FIG. 12 shows one variant of the interface adapter 5' which, in an analogous manner with respect to the other variants, is provided as a separate component for cable guidance or securing. The interface adapter 5' once again has joining contours 36 which are adapted to the joining or holding structure 17 of the fastening interface 16 of the rail slider 4 and correspond with it. A corresponding latching element or the clamp 37 of the adapter 5' also serves here to secure it on the rail slider 4 at its fastening interface 16.

The clamp-like or fork-like joining elements 38 of the adapter 5' once again engage over and under the corresponding contour of the rail slider 4 at its fastening interface 16, with the result that this adapter 5' is also joined or can also be joined securely to the rail slider 4. The gripper-like holding structures 39 of the adapter 5' once again serve to secure the cable guide 34 which is engaged around by the holding structures 39. The adapter 5' of this variant once again has a joint pin 31 for rotationally movable attachment of the lever 10*b* of the lever arrangement 10 to the rail slider assembly 1.

Figure 13:
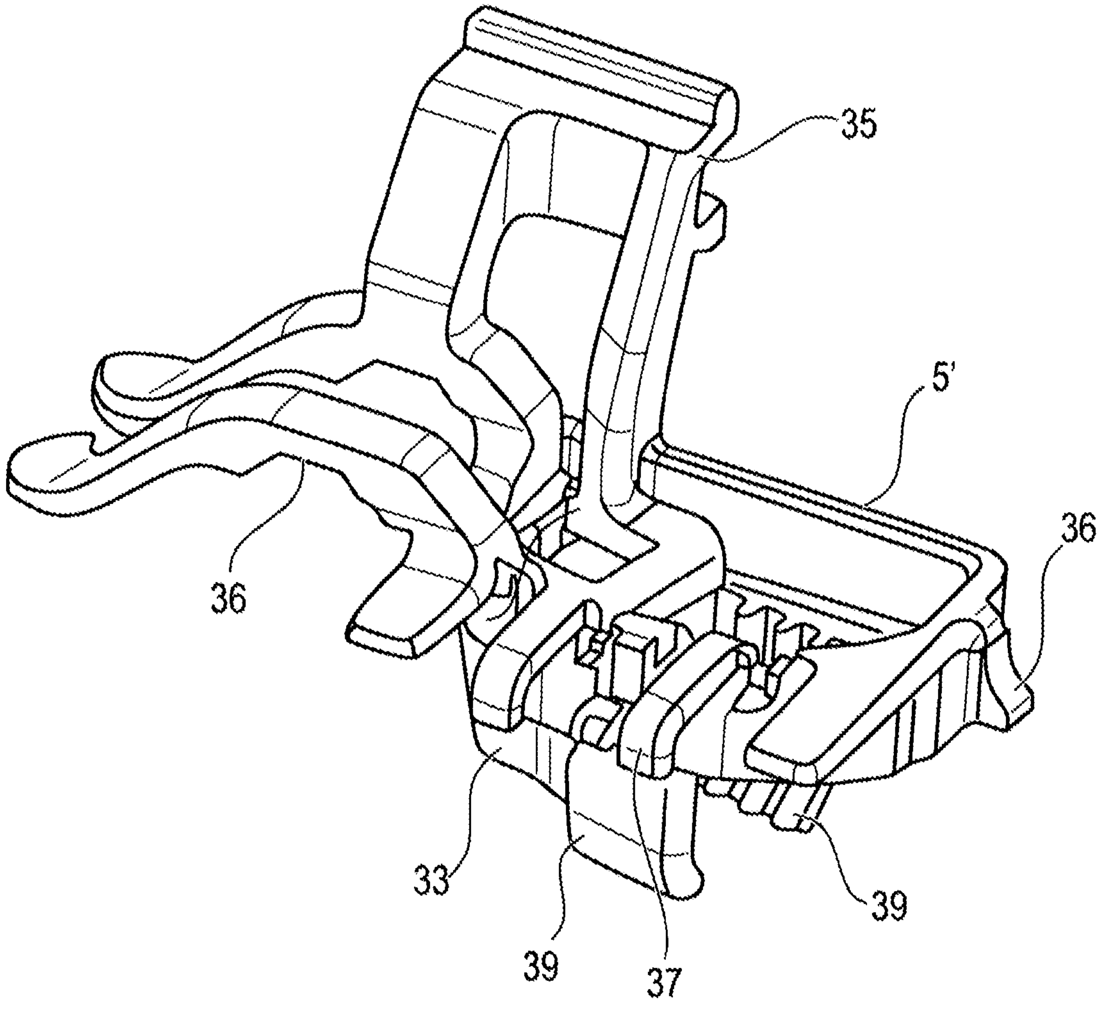
FIG. 13 is a perspective illustration of a fifth variant of the interface adapter.

FIG. 13 shows a further variant of the interface adapter 5' which, in an analogous manner with respect to the other variants, is provided as a separate component and is advantageously suitable for cable guidance and securing in this embodiment. The interface adapter 5' once again has joining contours 36 which are adapted to the joining or holding structure 17 of the fastening interface 16 of the rail slider 4. A corresponding latching element or the clamp 37 of the adapter 5' also serves here to secure it on the rail slider 4 at its fastening interface 16. The likewise gripper-like holding structures 39 of the adapter 5' once again serve to secure the cable guide 34 which, together with the electrical cable 9 which is guided therein, is engaged around by the holding structures 39.

Figure 14:
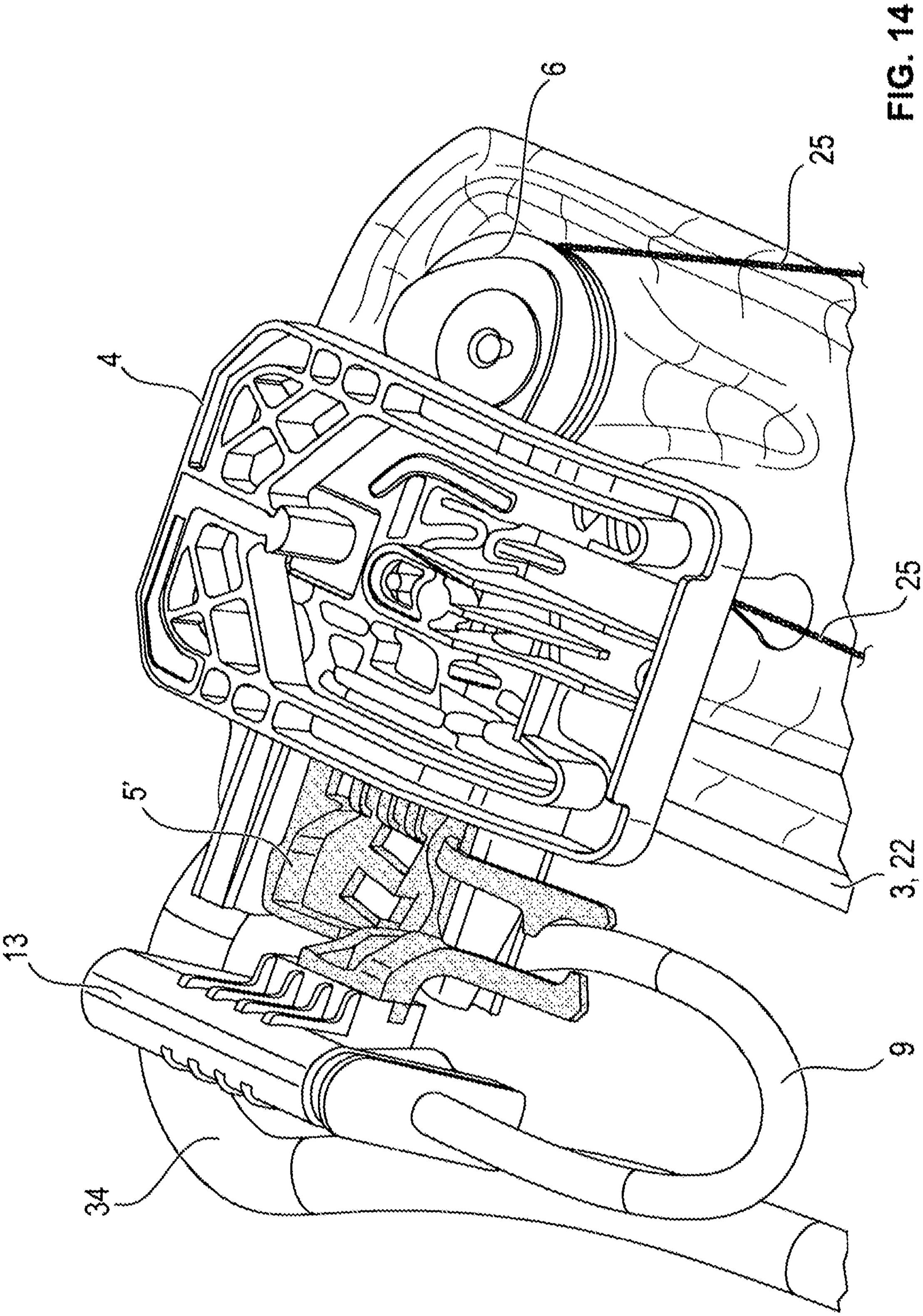
FIG. 14 is a perspective illustration showing details of the rail slider assembly which is guided on the guide rail, with the rail slider and an interface adapter according to FIG. 13 fastened thereto.
Figure 15:
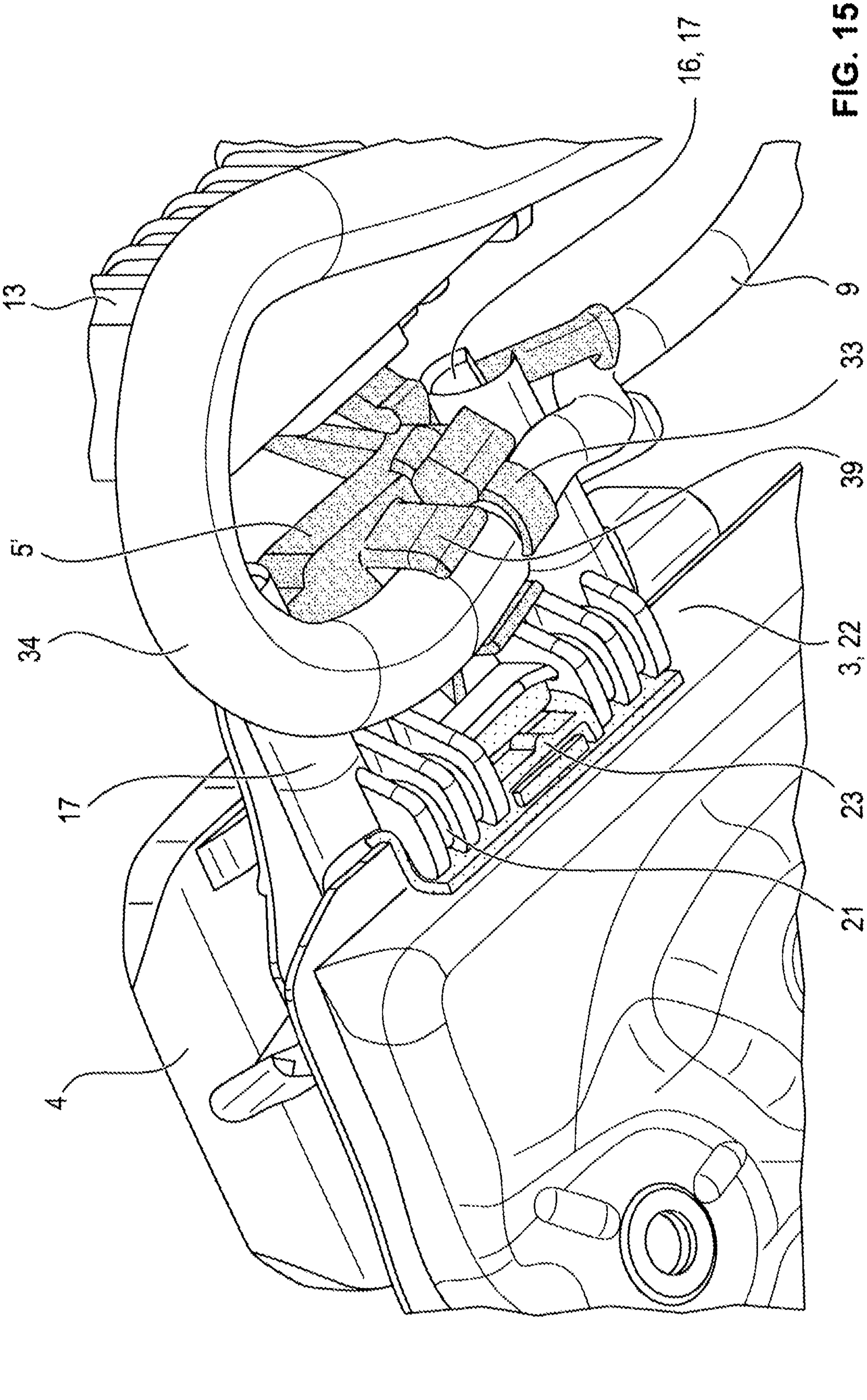
FIG. 15 is a further perspective illustration showing details of the rail slider assembly according to FIG. 12 with a view of the slider interface and that (lower) side of the interface adapter according to FIGS. 13 and 14 which faces it.

As can be seen from FIGS. 14 and 15, the adapter 5' of this variant also has a holding contour 35 for the connector plug 13 and a clamp element 33 for the electrical cable 9 or a corresponding cable portion 29.

Figure 16:
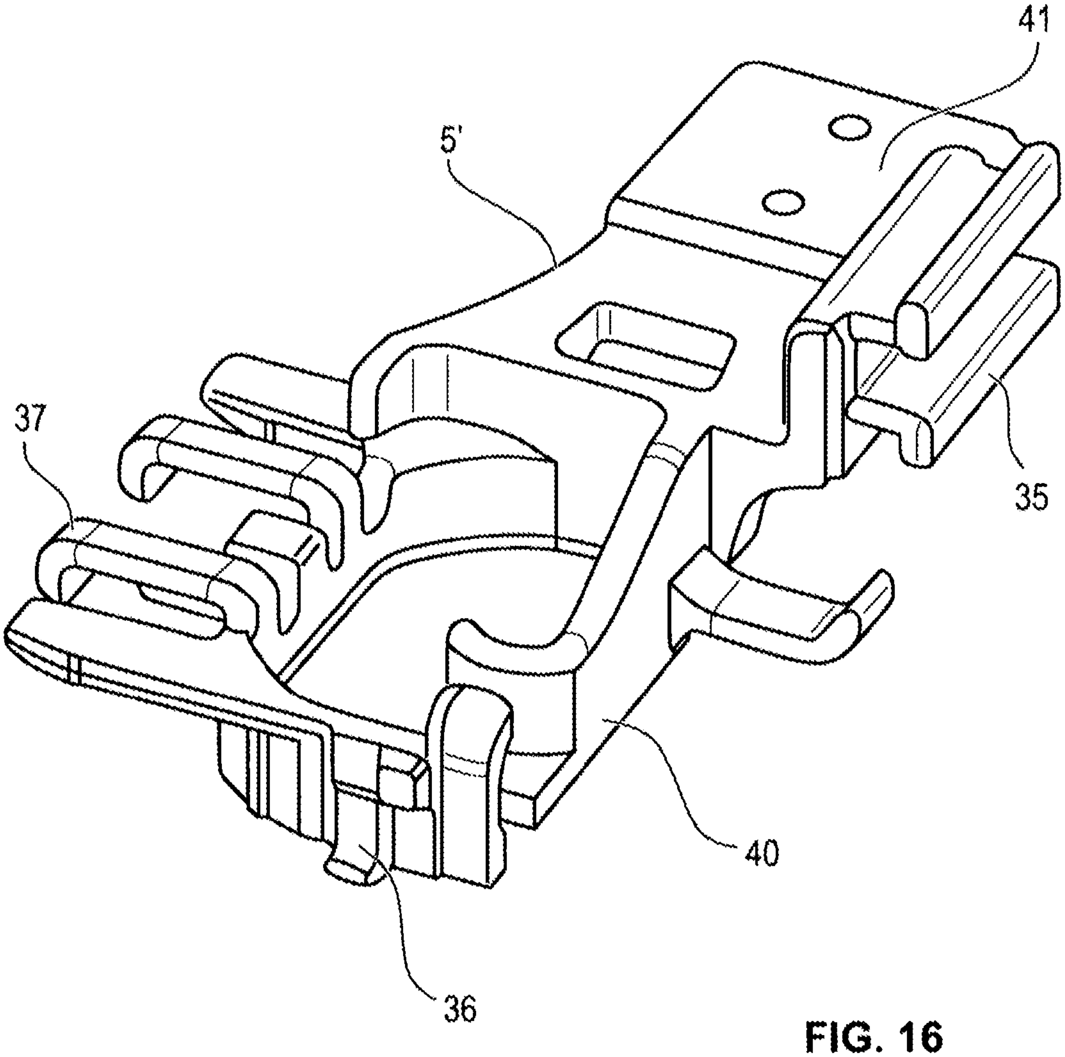
FIG. 16 is a perspective illustration of a sixth variant of the interface adapter.
Figure 17:
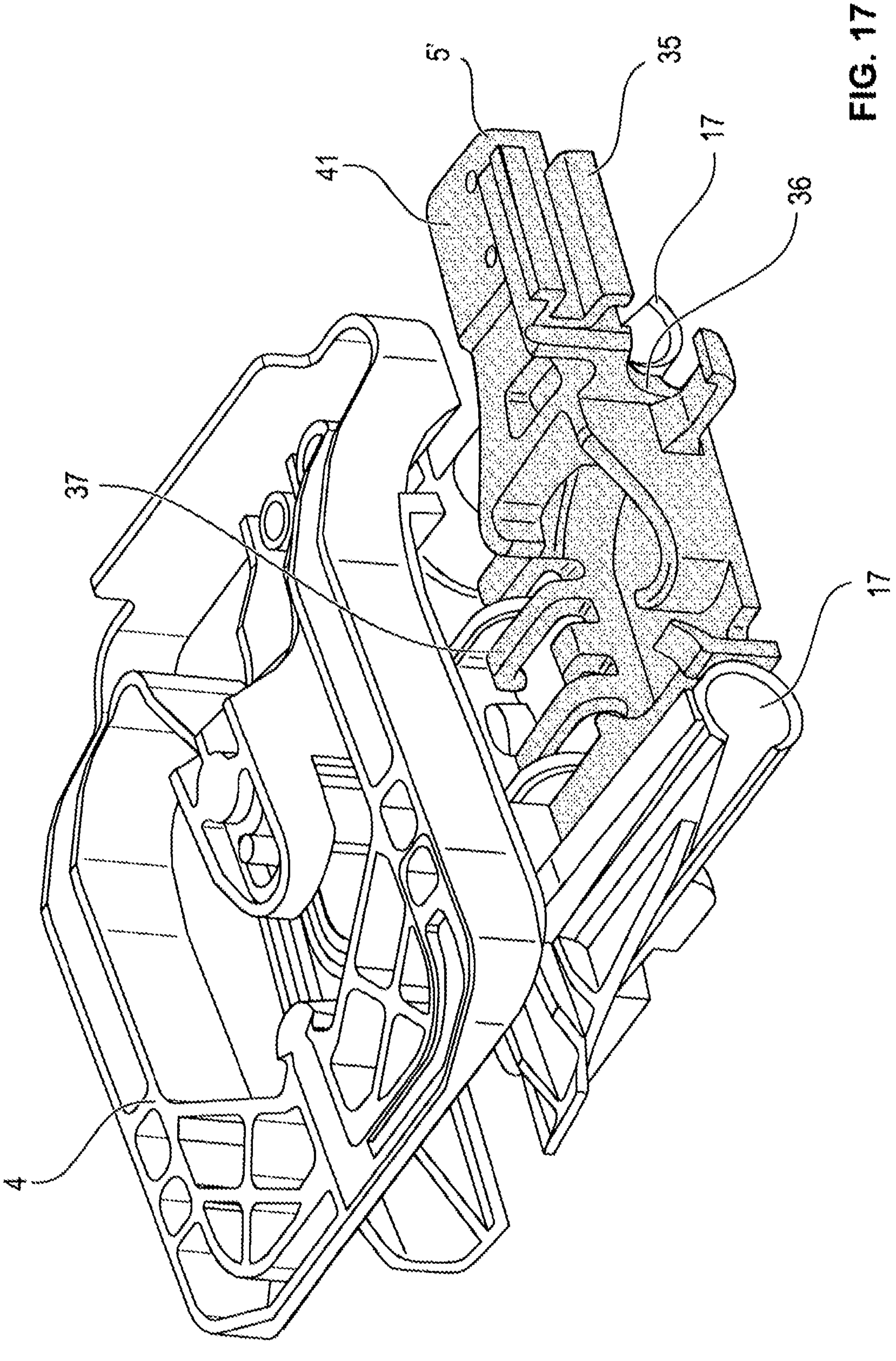
FIG. 17 is a perspective illustration of the rail slider assembly with the interface adapter according to FIG. 16.
Figure 18:
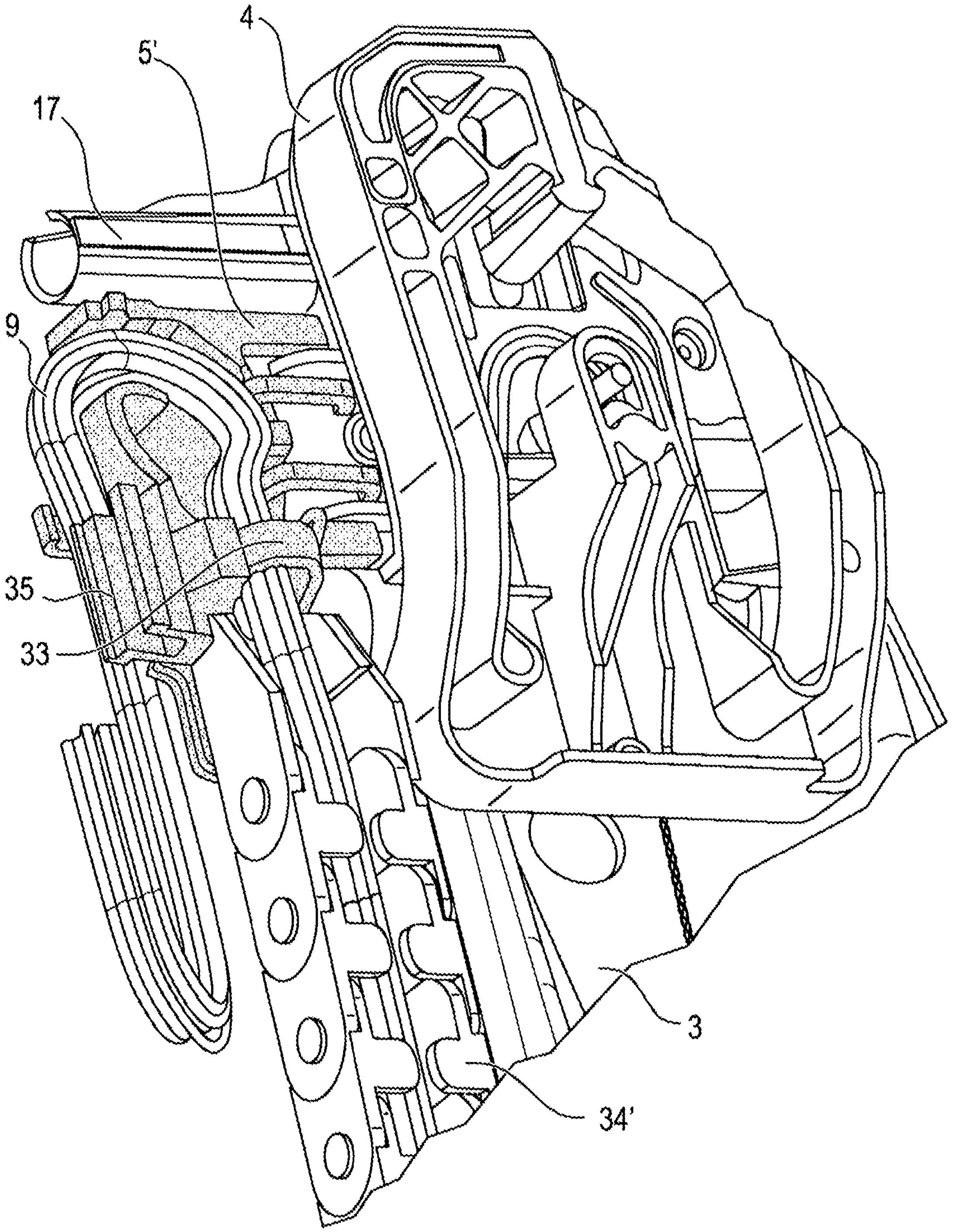
FIG. 18 is a perspective illustration showing details of the rail slider assembly which is guided on the guide rail, with the rail slider and an interface adapter according to FIG. 16 fastened thereto, and an electrical cable held thereon.

FIGS. 16 to 18 show a further variant of the interface adapter 5' for preferred use as a holder for the electrical cable 9. The interface adapter 5' once again has joining contours 36 which are adapted to the joining or holding structure 17 of the fastening interface 16 of the rail slider 4. A corresponding latching element or the clamp 37 of the adapter 5' also serves here to secure it on the rail slider 4 at its fastening interface 16. The adapter 5' of this variant has a pot-like adapter portion 40, by way of which the adapter 5' is seated between the socket-like receiving chambers 17 of the slider-side fastening interface 16. The adapter 5' of this variant also has a holding contour 35 for the connector plug 13.

As can be seen from FIG. 18, the adapter 5' of this variant has a joining portion 41, to which a cable guide 34' in the form of a drag chain is attached or can be attached.

In summary, the rail slider assembly 1 for a window lifter of a motor vehicle has a rail slider 4 and an interface adapter 5, 5' which is mounted or can be mounted on a mechanical fastening interface 16, 20 of the rail slider 4 or on a pane adapter 7, with a holding structure for fastening (in particular, in a positively locking manner) a cable guide 34 or an electrical cable 9 and/or an electric connector plug 13. The rail slider 4 has a slider interface 21 to a guide rail 3, and a driver interface 14 for a window pane 8 which, in particular, is functionalized and/or can be switched or controlled electrically, and at least one mechanical fastening interface 16, 20 for the interface adapter 5, 5'.

The (interface) adapters 5, 5' are preferably provided as additional components, in order to be mounted on the rail slider 4 in the case of a use of a functionalized (controllable, energizable) window pane 8, and to be provided as a respective rail slider assembly 1. The rail slider 4 or the (interface) adapter 5, 5' or the rail slider assembly 1 can also be configured with further interfaces, for example for securing excess cable lengths and/or for making contact with the pane.

The claimed invention is not restricted to the above-described exemplary embodiments. Rather, other variants of the invention can also be derived therefrom by a person skilled in the art within the context of the disclosed claims, without departing from the subject matter of the claimed invention. In particular, furthermore, all the individual features which are described in conjunction with the different exemplary embodiments can also be combined in a different way within the context of the disclosed claims, without departing from the subject matter of the claimed invention.

The following is a summary list of reference numerals and the corresponding structure used in the above description of the invention:

1 Window lifter assembly/assembly
2 Carrier plate
3 Guide rail
4 Rail slider/driver
4*a* Guide/sliding limb
4*b* Clamping limb
5,5' Interface adapter/adapter
6 Deflection elements
7 Pane adapter/adapter
8 Window pane
9 Electrical cable
10 Lever arrangement
10*a* First lever
10*b* Second lever
11 Rotary connection/joint
12 Cable drive/drive
13 Connector plug
14 Driver interface
15 Fixing structure
16 Fastening interface
17 Holding structure/receiving chamber
18 Flat side
19 Joining contour
20 Fastening interface
21 Slider interface/rail wraparound means
22 Guide contour/profile portion
23 Sliding insert
24 Cable end bottom
25 Pull cables
26 Joining element
27 Joining element
28 Holding element
29 Line/cable portion
30 Clamping/holding element
31 Joint pin
32 Holding structure
33 Clamp element
34 Guide tube/cable guide
34' Cable guide/drag chain
35 Holding contour
36 Joining contour
37 Latching element/clamp
38 Joining elements
39 Holding structure
40 Adapter portion
41 Joining portion
L Rail longitudinal direction

The invention claimed is:

1. A rail slider assembly for a window lifter of a motor vehicle, the rail slider assembly comprising:

a rail slider having a slider interface to a guide rail, a driver interface for a window pane, and at least one mechanical fastening interface;

an interface adapter mounted on said at least one mechanical fastening interface of said rail slider or on a pane adapter, said interface adapter having holding elements for fastening to at least one of a cable guide, an electrical cable, or an electric connector plug;

said rail slider having a flat side and a second side; and said rail slider having a grid-shaped or strut-shaped joining contour as said at least one mechanical fastening interface for said interface adapter on said flat side which faces away from at least one of said slider interface or the guide rail.

2. The rail slider assembly according to claim 1, wherein:

said at least one mechanical fastening interface includes at least one of:

a first mechanical fastening interface on said flat side which faces away from at least one of said slider interface or the guide rail; or a second fastening interface on said second side.

3. The rail slider assembly according to claim 2, wherein said second side faces said slider interface.

4. The rail slider assembly according to claim 1, wherein said interface adapter has a plurality of joining elements, said joining elements correspond with said grid-shaped or struct-shaped joining contour for producing a latching or clip connection.

5. The rail slider assembly according to claim 1, wherein in a mounted state on said rail slider, said interface adapter spans said rail slider transversely with respect to a slider and/or rail longitudinal direction.

6. The rail slider assembly according to claim 1, wherein holding elements of said interface adapter include at least one of: a holding structure; holding brackets; a holding element; a holding contour; or a clamp element for fastening to said at least one of a cable guide, an electrical cable, or an electric connector plug.

7. The rail slider assembly according to claim 6, wherein said holding brackets are hose clip-shaped or cable tie-shaped holding brackets.

8. The rail slider assembly according to claim 1, wherein said slider interface is configured to wrap around a portion of the guide rail.

9. The rail slider assembly according to claim 8, wherein said slider interface configured to wrap around a portion of the guide rail is L-shaped in cross section.

10. The rail slider assembly according to claim 1, wherein:

the window pane is at least one of:

a functionalized window pane, or a window pane that can be switched or controlled electrically; and said holding elements fastening to said at least one of a cable guide, an electrical cable or an electric connector plug in a form-locking manner.

11. The rail slider assembly according to claim 1, wherein in a mounted state on said rail slider, said interface adapter spans said rail slider, completely, transversely with respect to a rail longitudinal direction.

12. A window lifter of a motor vehicle, the window lifter comprising:

the guide rail; and the rail slider assembly according to claim 1.

13. A rail slider assembly for a window lifter of a motor vehicle, the rail slider assembly comprising:

a rail slider having a slider interface to a guide rail, a driver interface for a window pane, and at least one mechanical fastening interface; and an interface adapter mounted on said at least one mechanical fastening interface of said rail slider or on a pane adapter, said interface adapter having holding elements for fastening to at least one of a cable guide, an electrical cable, or an electric connector plug;

said rail slider having a first side, said at least one mechanical fastening interface of said interface adapter being a tubular or flute-shaped holding structure on said first side of said rail slider.

14. The rail slider assembly according to claim 13, wherein said interface adapter has joining contours, corresponding to said tubular or flute-shaped holding structure, which produces a latching or clamping connection to said rail slider.

15. The rail slider assembly according to claim 13, wherein said first side faces at least one of said slider interface or the guide rail.

* * * * *